March 24, 1953     H. M. OGLE     2,632,877
MAGNETIC AMPLIFIER CONTROL SYSTEM
Filed Dec. 30, 1949
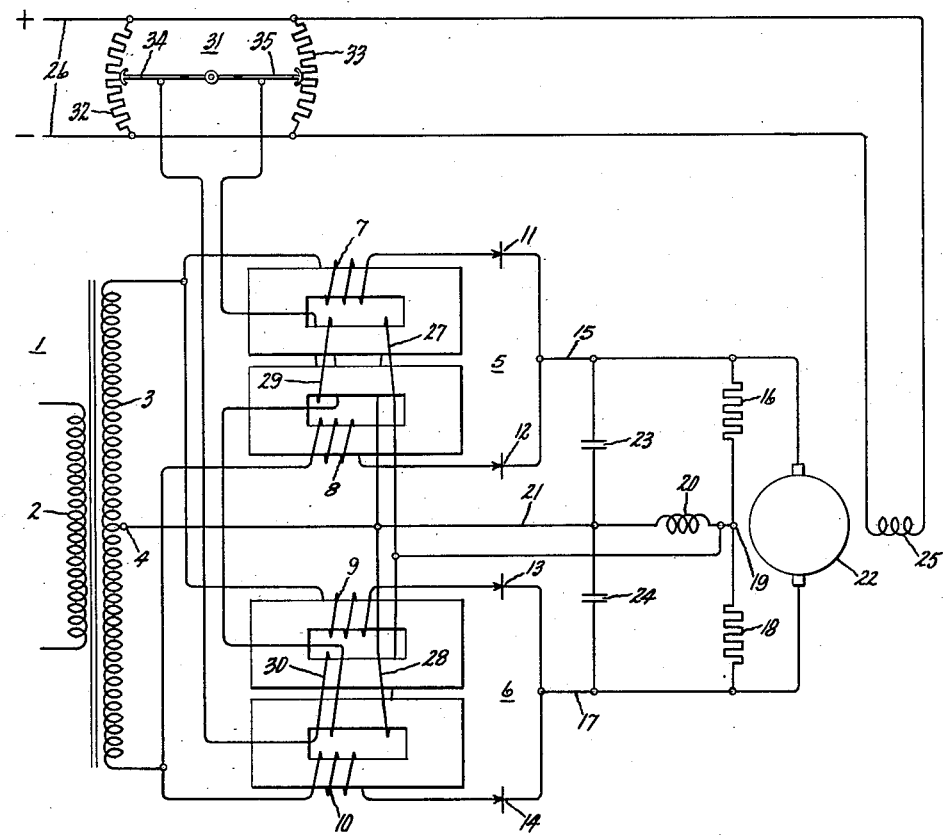
Inventor
Hugh M. Ogle,
by Paul A. Frank
His Attorney.

Patented Mar. 24, 1953

2,632,877

UNITED STATES PATENT OFFICE 2,632,877

MAGNETIC AMPLIFIER CONTROL SYSTEM

Hugh M. Ogle, Schenectady, N. Y., assignor to General Electric Company, a corporation of New York Application December 30, 1949, Serial No. 135,889

1 Claim. (Cl. 318—257)

This invention relates to magnetic amplifier control systems and, more particularly, to such systems which are suitable for use as reversible controls for electric motors.

In some of the known control systems of the above type, the motor operating characteristics obtainable are substantially those of a series motor. These characteristics often result in instability at the upper portion of the desired speed range of the motor, requiring the use of auxiliary speed limiting apparatus.

It is, therefore, an object of this invention to provide an improved, simple, economical magnetic amplifier control system providing a wide controlled range of speeds and having the inherent speed stability generally associated with a shunt field excited or separately excited electric motor.

This invention, therefore, generally comprises a magnetic amplifier control system employing two magnetic amplifiers of the self-saturating type, each including saturable reactors and rectifiers and employing a common return conductor from the center tap of an output voltage divider potentiometer. The motor, or other load being controlled, is connected across this voltage divider, and control windings are arranged on the saturable reactors to increase the output of one magnetic amplifier and to simultaneously decrease the output of the other magnetic amplifier to cause a resulting voltage across the motor terminals to give a desired motor speed.

For a more complete understanding of the invention, reference may be had to the following specification and the accompanying drawing which is a schematic circuit diagram of the system of this invention.

Referring more particularly to the drawing, there is shown a power input transformer 1 having a suitable primary winding 2 which is supplied from a suitable source of single phase alternating current voltage and a secondary winding 3 which is divided by a center tap 4. Transformer 1 supplies alternating current to magnetic amplifiers designated generally as 5 and 6 having reactance windings 7, 8, 9, and 10. Windings 7 and 9 are connected to one end of secondary winding 3, and reactance windings 8 and 10 are connected to the other end of winding 3 and similarly poled rectifiers 11, 12, 13, and 14 are respectively connected in series with the windings 7-10 to conduct current to the right in the diagram. The output from both windings 7 and 8 of amplifier 5 is conveyed by conductor 15 to a voltage divider resistance 16. The output of windings 9 and 10 of amplifier 6 is similarly conveyed by a conductor 17 to voltage divider resistance 18. Resistances 16 and 18 are connected at a center tap 19, and this point is connected through a motor field winding 20 to the center tap 4 of the input transformer secondary winding 3. The motor 22 to be controlled is connected between the output conductors 15 and 17. The magnetic amplifier circuits described above, including the rectifier elements 11-14, are also full wave rectifier circuits having the common return path including winding 20 and conductor 21. Capacitors 23 and 24 are provided for smoothing out the alternating current ripple voltage in the output of these rectifier circuits. A separately excited field 25 is provided for motor 22 and this field is energized from a suitable source of direct current indicated at 26.

Bias windings 27 and 28 are provided for each of the magnetic amplifiers 5 and 6 and these windings are connected to be energized by the voltage drop across motor field winding 20. Control windings 29 and 30 are respectively provided for the amplifiers 5 and 6 and these windings are series connected to be energized by a reversible polarity direct current through a polarity reversing device 31 which derives its energy from direct current source 26. This polarity reversing device comprises a double potentiometer having two resistance elements 32 and 33 connected in parallel across the source of supply voltage and slidable contacts 34 and 35 which are respectively moved toward opposite conductors of the supply circuit as the device is adjusted. As shown, the device is adjusted to give zero excitation to the control windings.

In operation, with polarity reversing device 31 adjusted as shown for zero excitation, current is conducted by the reactance windings 7-10 and rectified by rectifier elements 11-14 and thereby supplied to the amplifier output conductors 15 and 17 to cause direct currents to flow respectively in resistances 16 and 18 toward center connection 19 and to return through motor field winding 20 and conductor 21 to center tap 4 of transformer secondary winding 3. Under these conditions, the currents in resistances 16 and 18 being approximately equal, the voltage drops across these resistances are approximately equal and, as a result, the voltages at output conductors 15 and 17 are equal so that no voltage is supplied to the armature of motor 22. The motor, therefore, is at a standstill. However, motor field windings 20 and 25 are energized so that whenever an armature voltage is available, a motor torque will be created.

As stated previously, bias windings 27 and 28 are connected to be energized by the voltage drop across field winding 20. These windings, when energized under the motor's standstill conditions described above, operate to oppose the saturation which would otherwise occur in the magnetic structures of amplifiers 5 and 6 by reason of the rectified currents in reactance windings 7, 8, 9, and 10, thus to cut down the standstill current in the control system. The saturation due to current in the reactance windings will hereinafter be referred to as self-saturation.

When the polarity reversing device 31 is adjusted in either direction from the position shown to cause an excitation current in control windings 29 and 30, one of these control windings sets up a flux which assists the self-saturation flux produced by the current in the associated reactance windings and the other of these control windings sets up a flux which opposes the self-saturation flux set up by the current in the associated reactance windings. Assuming that winding 29 assists self-saturation and winding 30 opposes self-saturation, winding 29, therefore causes amplifier 5 to saturate at an earlier point in each half cycle of current, thus causing the reactance to decrease and the output of amplifier 5 to increase, increasing the current in output conductor 15. Conversely, in amplifier 6, the winding 30 causes saturation to occur later in each half cycle, or completely prevents saturation, thus causing an increase in the reactance of windings 9 and 10 and a corresponding decrease in the current in output conductor 17. Thus, there is an unbalance in the currents through resistances 16 and 18, the current in resistance 16 having increased while the current in resistor 18 having decreased to produce unequal voltage drops across these resistors. Since these resistors are interconnected at point 19, the difference of the respective voltage drops causes a difference of potential between conductors 15 and 17 which is impressed across the armature of motor 22 causing an armature torque and resulting in motor rotation. The speed of motor rotation, for any particular setting of polarity reversing device 31 will be constant for a constant motor load. By proper adjustment of polarity reversing device 31, rotation of motor 22 in either direction over a complete range of motor speeds may be obtained.

As the armature voltage across motor 22 increases, the current in field winding 20 will increase. This feature of the above control permits variation of field control characteristics to increase or decrease the speed range of motor 22 and to correspondingly affect its stability. For instance, separately excited winding 25 may be connected and arranged as the main field winding, and winding 20 may be connected to oppose winding 25 so that, as the speed of motor 22 increases, and the current in winding 20 increases, the total field excitation will be effectively reduced so as to raise further the motor speed to increase the speed range.

On the other hand, winding 20 may be connected to assist winding 25 to obtain greater field excitation at higher motor speeds to attain greater stability. In this connection, winding 25 may be eliminated altogether, and the complete motor excitation supplied by winding 20 to give even more stability. The above-mentioned typical modifications are not shown by separate diagrams since they are believed to be obvious to those skilled in the art.

It will be seen from the above description that this invention provides an improved magnetic amplifier control system which is particularly well adapted for use as a reversible control for electric motors in providing an improved, economical, simple, variable speed control for a wide speed range, and having improved stability.

While certain specific embodiments have been shown and described, it will, of course, be understood that various modifications may be made without departing from the invention. The appended claim is, therefore, intended to cover any such modifications within the true spirit and scope of the invention.

What I claim as new and desire to secure by Letters Patent of the United States is:

A magnetic amplifier control system for reversible control of an electric motor comprising an input power transformer having a secondary winding with a center tap thereon, two magnetic amplifiers each having a pair of reactance windings each connected to an opposite end of said input transformer secondary winding, rectifier units connected in circuit with each of said reactance windings to permit conduction of current in said reactance windings in only one direction with respect to said input transformer, a voltage divider having resistor portions each connected in series with the reactance windings of a respective one of said magnetic amplifiers, a return circuit from the interconnection of said resistor portions to said input transformer secondary center tap, an electric motor having a field excitation winding connected in said return circuit, an armature winding for said motor connected in parallel with said voltage divider, a separately excited field winding for said motor, bias windings for said magnetic amplifiers connected in parallel with said first-mentioned motor field excitation winding, control windings on each of said magnetic amplifiers connected for simultaneously increasing the saturation of one and decreasing the saturation of the other of said amplifiers and a polarity reversing device for adjusting the polarity and magnitude of current supplied to said control windings.

HUGH M. OGLE.

REFERENCES CITED

The following references are of record in the file of this patent:

UNITED STATES PATENTS

| Number | Name | Date |
|---|---|---|
| 1,686,029 | Pierce | Oct. 2, 1928 |
| 2,100,715 | Jenks | Nov. 30, 1937 |
| 2,113,234 | Lee | Apr. 5, 1938 |
| 2,213,882 | Ludbrook | Sept. 3, 1940 |
| 2,288,339 | Willis | June 30, 1942 |
| 2,401,168 | Kronenberger | May 28, 1946 |
| 2,414,936 | Edwards et al. | Jan. 28, 1947 |
| 2,552,952 | Gachet | May 15, 1951 |
| 2,571,708 | Graves | Oct. 16, 1951 |